United States Patent [19]
Urquhart

[11] 3,752,414
[45] Aug. 14, 1973

[54] PLASTIC PIRN SLEEVE

[75] Inventor: Thomas Urquhart, Whitby, Ontario, Canada

[73] Assignee: DuPont of Canada Limited, Montreal, Canada

[22] Filed: Feb. 19, 1971

[21] Appl. No.: 117,013

[52] U.S. Cl. .................................... 242/118.32
[51] Int. Cl. ..................... B65h 75/26, B65h 75/10
[58] Field of Search ................. 242/118.32, 118.31, 242/118.3, 118.1, 118.11

[56] References Cited
UNITED STATES PATENTS

| | | | |
|---|---|---|---|
| 210,977 | 12/1878 | Walt | 242/118.3 |
| 2,163,618 | 6/1939 | Muller | 242/118.3 |
| 2,793,822 | 5/1957 | Consoletti | 242/118.32 |
| 3,034,743 | 5/1962 | Hill | 242/118.32 |

*Primary Examiner*—George F. Mautz
*Attorney*—John E. Griffiths

[57] ABSTRACT

A plastic pirn sleeve bearing rows of circumferential fine grooves having flush ends to prevent filament entangling. A process and apparatus useful for making such sleeves are disclosed for indenting the external surface of a thermoplastic tube by heating the external surface of the tube above its softening point, rolling at least three die wheels each in a separate path along the length of the surface of the tube while the tube is supported on a mandrel and at the same time pressing the die wheels against the surface of the tube to form permanent indentations therein.

1 Claim, 8 Drawing Figures

Patented Aug. 14, 1973
3,752,414
2 Sheets-Sheet 1
FIG. I
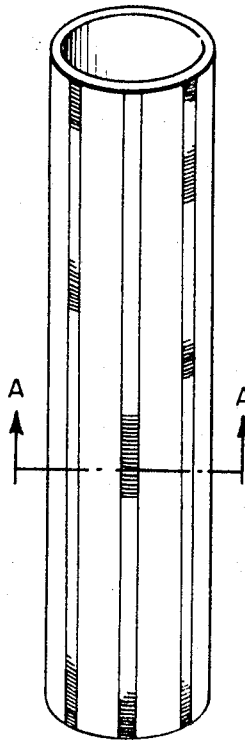
FIG. II
FIG. III
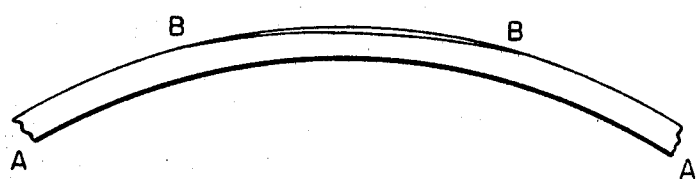
FIG. IV
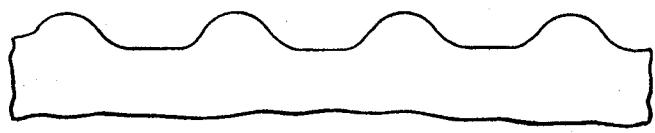
FIG. V
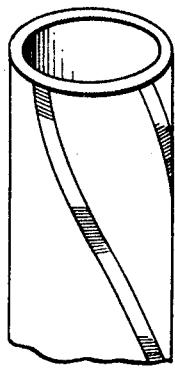
FIG. VI
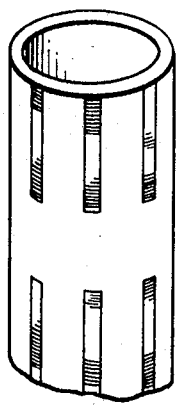
FIG. VII
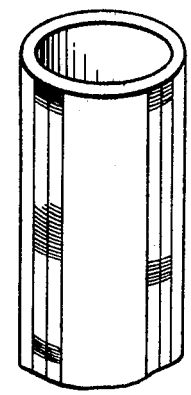
INVENTOR
THOMAS URQUHART
BY John E. Griffiths
ATTORNEY

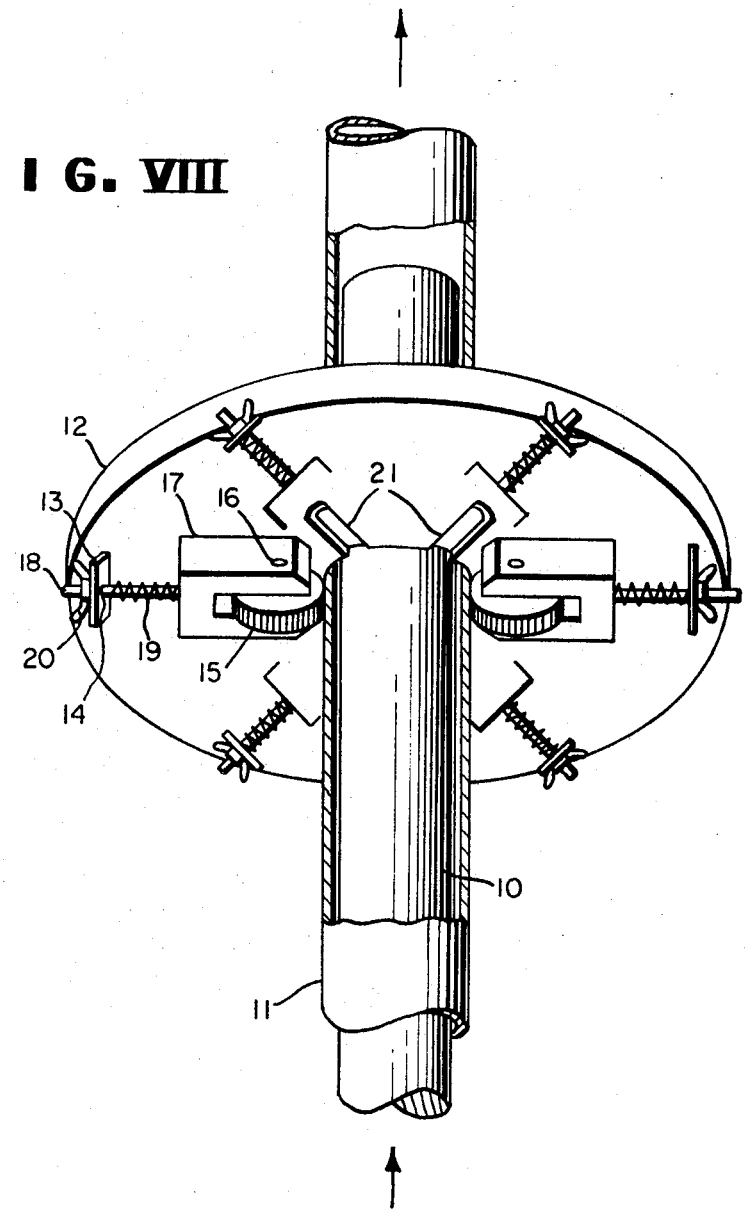

PLASTIC PIRN SLEEVE

BACKGROUND OF THE INVENTION

This invention relates to plastic pirn sleeves and to a process and apparatus for producing rows of indentations in the external surface of thermoplastic tubing useful for making such sleeves.

Indentations in the external surface of thermoplastic tubing are required in various applications for utilitarian and for decorative purposes. One such application is in the production of plastic sleeves for textile bobbins or pirns. The indentations can take the form of circumferential grooves arranged in rows, parallel to the axis, with intervening axial blank areas. These grooves and their associated "teeth," however, have ends which are raised above the surface of the intervening axial blanks. These exposed ends, unfortunately, can be ragged and entangle fine filaments jeopardizing smooth payout of filaments on high speed unwinding. It is the purpose of this invention to provide a novel plastic pirn sleeve having the ends of grooves and "teeth" substantially flush at the juncture with the intervening axial blank areas. It is a further purpose to provide pirn sleeves that allow a smoother yarn take-off tension which can be varied by varying the width and number of grooves rows. It is a further purpose to provide a non-entangling flush-end grooved pirn sleeve that is adaptable to manufacture on a continuous and low cost basis.

Several methods are known for indenting the external surface of thermoplastic tubes. One such method whereby indentations are made on the external surface of a pirn sleeve is described in U. S. Pat. No. 3,095,161 issued June 25, 1963 to R. Atwood and C. C. L'Allemand.

It is an object of the present invention to provide a novel method and apparatus for indenting the external surface of a thermoplastic tube to make such a sleeve.

It is another object of the present invention to provide a novel method and apparatus for indenting the external surface of a thermoplastic tube being continuously withdrawn from a source of supply.

BRIEF DESCRIPTION OF THE DRAWING

The plastic pirn sleeves of this invention as shown in FIGS. I, V, VI and VII are characterized in having at least two longitudinal rows of grooved indentations in the surface, said rows spaced apart by blank areas that are substantially flush with the ends of the grooves and accompanying "teeth"; the circumferential or lateral profile of said teeth being a chordal or lunal segment of a circle, FIGS. II and III further said grooved indentations being spaced in the range of about 30–70 grooves per inch and having a maximum depth peak-to-valley of 0.002 to 0.010 inch in the central portion, tapering at the ends to be substantially flush with said blank areas, as shown at B, FIGS. II, III, the width of said rows of indentations being about one thirty-second to one-half inch. The grooves may be circumferential or may lie at as much as a 10° angle to the circumference of the sleeve. The rows of grooves may be essentially parallel with the axis of the sleeve or they may be at an angle of up to 45° spiraling around the sleeve. The rows of indentations may be continuous from end to end of the sleeve or may be broken in shorter strips as shown in FIGS. I, V, VI and VII.

Preferably the grooves on the pirn sleeve should be 0.004 to 0.006 inch deep at the central portions, yielding in a 1¾ inch diameter sleeve, a row width of about one-eighth inch for a chordal segment and up to one-half inch for a lunal segment. The number of grooves is preferably 40–50 per inch. The number of rows can vary with the width of the rows, the depth of the grooves and with the diameter of the sleeve. Preferably there should be three to 16 rows. With a sleeve of 1¾ inch diameter, six to 10 ⅛ inch wide rows are particularly preferred. With sleeves of 2 to 3 inches in diameter or even larger, a proportionate larger number of rows is desired.

In accordance with the present invention, there is also provided a process for indenting the external surface of a thermoplastic tube comprising heating the external surface of the tube to a temperature above the softening point of the thermoplastic material, rolling at least three die wheels each in a separate path along the length of the external surface of the tube while supporting the tube on a mandrel and at the same time pressing the die wheels against the surface of the tube to form permanent indentations therein.

A further embodiment of the present invention provides an apparatus for indenting the external surface of a thermoplastic tube, comprising a mandrel and at least three rotatable die wheels located about the mandrel, the mandrel adapted to support a thermoplastic tube, heating means adapted to raise the external surface temperature of the tube above the softening point of the thermoplastic material, each die wheel having a rim with indentations thereon, each rim adapted to roll on the surface of the tube in a longitudinal direction, and pressure means adapted to hold each wheel against the tube.

The apparatus of the present invention may be illustrated more fully by the following description taken in conjunction with the accompanying drawing, FIG. VIII which is a schematic view of a preferred embodiment of the invention with a part section to show a mandrel.

In FIG. VIII a mandrel 10 supports a thermoplastic tube 11. A frame in the form of a flat disc 12 is mounted such that the tube 11 supported by the mandrel 10 passes through a round opening in the centre of the disc 12. Brackets 13, each with round holes 14 whose axes are directed at right angles toward the axis of tube 11, are attached on one side of the flat disc 12. A bolt 18 passes through the hole 14 in each bracket 13 and the end of the bolt nearest the tube 11 is attached to a U-bar 17. A rotatable die wheel 15 (one of six as designed) having an axle pin 16 is mounted in each U-bar 17, and all the wheels 15 rest on the surface of the tube 11 supported by the mandrel 10. The rims of the die wheels 15 have a grooved or patterned contour as desired. Slots 21 in the flat disc 12 are provided (one slot for each die wheel) to act as guides to align the die wheels 15 with the tube 11. A spring 19 on each bolt 18, and compressed between the bracket 13 and the U-bar 17, holds each die wheel 15 against the surface of the tube 11. The magnitude of the springs control the pressure of the die wheels 15 on the tube 11. Wing nuts 20 are provided on bolts 18 for adjustment of the position of the die wheels 15 relative to the tube 11.

In operation, a thermoplastic tube 11, having an external surface temperature above the softening point of the thermoplastic material moves in the direction shown in the drawing between the rotatable die wheels 15 which are pressed against the surface of the tube 11 by the pressure of the springs 19. The required external surface temperature of tube 11 by the pressure of the springs 19. The required external surface temperature of tube 11 may have been achieved using internal or external radiant heaters, for example, or the tube may have been extruded from an extruder and only partially cooled. As the die wheels 15 roll on the surface of tube 11, (parallel to the longitudinal axis of the tube), the indentations on the rims of the die wheels 15 are permanently impressed into the surface of tube 11. The maximum depth of the die wheel impressions is controlled by the adjustment of wing nuts 20. It is appreciated that the springs 19 may be replaced by other equivalent means for regulating the pressure of the die wheels 15 on the tube 11, for example air or hydraulic cylinders.

The tube may be moved over a stationary mandrel between the rotatable die wheels; the tube may be moved on and with a mandrel between the rotatable die wheels; or the mandrel and the tube may be kept stationary while the frame on which the rotatable die wheels are located is moved along the tube.

The die wheels can be as idlers or can be driven to form part or all of a mechanism to propel the tubing along the mandrel. The frame 12 for the die wheels, in turn can be rotated so that the rows of indentations are placed in a helical rather than straight track. The die wheels may be located in frame 12 FIG. VIII not only as shown in a spaced apart arrangement but they can also be located in dual frames in a staggered relationship; so that the tracks of the die wheels can be more closely spaced thought still apart by blank areas or can be grouped together in combinations of two or more tracks, side by side, with blank areas only between the combinations, producing a pattern as shown in FIG. VII.

Various modifications of the above embodiment of the present invention may be obvious to one skilled in the art, for example, the thermoplastic tube 11 need not have an external surface temperature above the softening point of the thermoplastic material when it moves in the direction shown in the drawing. The required external surface temperature of the tube may be achieved by making mandrel 10 a heating mandrel or die wheels 15 may be heated sufficiently to indent the surface of an unheated tube.

Tubes made from various thermoplastic materials may be indented according to the present invention; for example, those made from polyethylene, polypropylene, polyvinyl chloride and its copolymers, celluloses such as cellulose acetate butyrate, or an acrylonitrile-butadiene-styrene material (known as ABS resin).

The surface of the rims in the axial direction of the die wheels used to indent thermoplastic tubes according to the present invention is preferably flat in shape. Rims slightly convex or slightly concave are acceptable, however, a scuffing effect (due to unequal surface speeds between the middle and the outside edges of the rim) may occur if the concave curvature of the rims is too great.

Die wheels with a flat axial face produce grooves in the tubing that have a lateral profile that is chordal, as in FIG. II, in the range of one-sixteenth to three-sixteenths inch wide. Die wheels with a concave face produce grooves that are lunal in profile, and may produce rows up to one-half inch wide or wider. The patterning on the surface of the die wheels can be continuous or it can be interrupted, for example, so as to produce the rows of indentations in the style shown in FIG. VI.

The surface of the die wheels can carry transverse "teeth" — grooves of 30–70 per inch. These "teeth" grooves may be of trianglar, rounded or sinusoidal wave in cross section. The resulting indentations in the tubing, depending upon dwell-time, pressure, temperature and character of the polymer, may be the same or differ in cross section from the profile of the die wheel. For example, a triangular tooth on the die can mold a flat-bottomed groove with a semi-circular mound between grooves. This style aids filament release. The flat bottomed groove can vary in width and for some applications the width of this groove will be almost insignificant.

The surface of the die wheels though preferably grooved, also can be etched, knurled or grit-blasted or carry other embossing patterns which (1) do not produce in the pirn sleeve a character that of itself will entangle the filaments and that (2) will provide a flush, non-entangling juncture with the blank areas of the pirn sleeves.

The surface temperature of the thermoplastic tube at the point of indentation varies according to the type of thermoplastic material. Each type and grade of plastic has a different temperature range at which the tube is soft enough to permanently deform but hard enough to withstand the strains on its overall dimensional stability and uniformity imposed by the marking process. A tube of ABS pipe grade resin, for example, requires a surface temperature in the range of 350° to 375°F during indentation.

Alternatively, the pirn sleeves of this invention can be produced by replacing the die wheels by flat, patterned dies pressed against the tubing. These may take the form of patterned metal belts which roll in contact with the tubing and can serve at the same time as a pulling mechanism. In another variation, a heated wire grid can be pressed tangentially across the surface of the tubing to produce a row of grooves. In yet another variation helical threaded rollers or cutters rotating parallel with the axis of the pirn sleeves can be induced to impress a grooved pattern in the sleeve surface.

The present invention may be further illustrated by the following example.

For some design of pirns a beading of one end of the sleeve is desirable. This can be done, for example, by heating one end of the tubing and forcing the softened end of the tubing into an inverting mold which forces the tube to turn in on itself about 180° to form a smooth bead about one-eighth inch wide.

EXAMPLE

An ABS pipe grade resin tube having an outside diameter of about 1¾ inch in a wall thickness of about 0.020 inch was continuously extruded from an extruder at a temperature of about 360°F. After extrusion, a haul-off mechanism pulled the tube over a stationary cooling mandrel (the mandrel being supported by the extruder), through a stationary frame supporting six rotatable die wheels of the type illustrated in the drawing equispaced about the external surface of the tube, and then through a cooling shroud. The tube was then cut in predetermined lengths to be used as sleeves for textile pirns. Each die wheel had a ¼ inch wide cylindrical rim indented as follows: 45 grooves per inch running axially across the rim; the peak to valley height of the grooves being 0.006 inch. The temperature of the external surface of the tube at the point of indentation was approximately 360°F. Each pirn sleeve produced above had six parallel ⅛ inch wide indented strips, corresponding to the rims of the six die wheels, running the entire length of the pirn, see FIG. I. The pirn sleeves were subsequently fitted on pirns and yarn was wound thereon. No internal sloughing of the yarn wound on these pirn sleeves was detected.

I claim:

1. A plastic pirn sleeve comprising a tube carrying at least two longitudinal rows of circumferential grooves alternating with longitudinal blank areas, said grooves having a lateral profile that is chordal or lunal with a maximum depth peak-to-valley of 0.002 to 0.010 inch and tapering at either end to be essentially flush with said blank areas, said grooves spaced substantially uniformly in the range of 30–70 grooves per inch, said longitudinal rows being about one-eighth inch in width and numbering six to 10 on about a 1¾ inch diameter sleeve.

* * * * *